US005096468A

United States Patent [19]
Minhas

[11] Patent Number: 5,096,468
[45] Date of Patent: Mar. 17, 1992

[54] CELLULOSE ACETATE BUTYRATE GAS SEPARATION MEMBRANES

[75] Inventor: Bhupender S. Minhas, Columbia, Md.

[73] Assignee: W. R. Grace & Co.-Conn., New York, N.Y.

[21] Appl. No.: 547,549

[22] Filed: Jun. 29, 1990

Related U.S. Application Data

[63] Continuation of Ser. No. 298,588, Jan. 17, 1989, abandoned, which is a continuation-in-part of Ser. No. 109,648, Oct. 19, 1987, abandoned.

[51] Int. Cl.$^5$ .................... B01D 53/22; B01D 71/18
[52] U.S. Cl. ............................ 55/16; 55/68; 55/70; 55/158
[58] Field of Search .............. 55/16, 68, 158, 70; 210/500.29, 500.30; 264/455, 48, 49, 345, 346, DIG. 14

[56] References Cited

U.S. PATENT DOCUMENTS

| | | | |
|---|---|---|---|
| 3,283,042 | 11/1966 | Loeb et al. | 264/49 |
| 3,607,329 | 9/1971 | Manjikian | 264/49 X |
| 3,842,515 | 10/1974 | MacDonald et al. | 55/16 X |
| 4,080,743 | 3/1978 | Mands | 55/16 X |
| 4,080,744 | 3/1978 | Manos | 55/16 X |
| 4,127,625 | 11/1978 | Arisaka et al. | 55/16 X |
| 4,130,403 | 12/1978 | Cooley et al. | 55/16 |
| 4,134,742 | 1/1979 | Schell | 55/16 |
| 4,172,885 | 10/1979 | Perry | 55/16 X |
| 4,180,552 | 12/1979 | Graham et al. | 55/16 X |
| 4,180,553 | 12/1979 | Null et al. | 55/16 X |
| 4,210,529 | 7/1980 | Petersen | 55/16 X |
| 4,430,807 | 2/1984 | Davis et al. | 55/16 X |
| 4,527,999 | 7/1985 | Lee | 55/16 |
| 4,681,605 | 7/1987 | Gollan | 55/16 X |
| 4,681,713 | 7/1987 | Miyagi et al. | 210/500.3 X |

FOREIGN PATENT DOCUMENTS

| | | | |
|---|---|---|---|
| 51-094482 | 8/1976 | Japan | 55/16 |
| 59-055308 | 3/1984 | Japan | 55/158 |
| 59-105806 | 6/1984 | Japan | 55/158 |

OTHER PUBLICATIONS

Eastman Chemicals Product Information; Publication No. E-146 H; Jun., 1984 (5 pp.).
Gardner et al., "Hollow Fiber Permeater for Separating Gases", CEP, Oct., 1977; pp. 76-78.
Knieriem; "Membrane Separation Saves Energy"; Hydrocarbon Processing, Jul. 1980, pp. 65-67.
Manjikian et al., "Characterization of Cellulose Acetate Butyrate Membranes"; Research & Development Progress Report No. 654; May 1971; pp. 1-110.
Mazur et al.; "Gas Separation Membranes-Now and Tomorrow"; Envirogenics Systems Co.; Jun. 1984; 32 pp.
Monsanto Sales Literature Cammonia Applications), 1981, 2 pp.
Schell et al.; "Membrane Applications to Coal Conversion Processes"; Envirogenics Systems Co.; U.S. Dept. of Commerce Intis; Oct. 1976, pp. 1-153.

*Primary Examiner*—Robert Spitzer
*Attorney, Agent, or Firm*—Valerie E. Looper; Steven T. Trinker

[57] ABSTRACT

High performance cellulose acetate butyrate gas separation membranes are prepared from a casting solution containing from about 10 to 30 percent polymer, 35 to 70 percent solvent, and 15 to 30 percent pore-forming agents. A film casting solution is cast onto a substantially flat support surface and a dense layer is formed on the exposed film surface. The film is gelled, washed, and dried to produce a particularly useful gas separation membrane. The cellulose acetate polymers used in this preparation have molecular weights of at least about 20,000, and have about 10 to about 45% butyryl groups, about 2 to about 35% acetyl groups, and about 0.8 to about 2 percent hydroxyl groups, by weight. The membranes may be used for separating a feed gas into a permeate fraction and a residual fraction, and are particularly useful for separating gases in the purge gas stream of ammonia plants to recover a permeate which is relatively rich in hydrogen. Cellulose acetate butyrate membranes may be used to improve the separation of ammonia plant purge gases which contain ammonia as well as hydrogen and nitrogen, especially when there is no pretreatment of the purge gas to remove ammonia gas.

10 Claims, 2 Drawing Sheets

CELLULOSE ACETATE BUTYRATE GAS SEPARATION MEMBRANES

This is a continuation of application Ser. No. 07/298,588, filed on Jan. 17, 1989, now abandoned, which is a continuation-in-part of application Ser. No. 07/109,648, filed on Oct. 19, 1987, and now abandoned.

FIELD OF THE INVENTION

This invention relates to high performance gas separation membranes, and methods for making and using these membranes.

BACKGROUND OF THE INVENTION

The use of membranes for gas separation is becoming increasingly more common. In these systems, a mixture of gases, the feed gas, under relatively high pressure is passed across the surface of a membrane adapted to act as a selective barrier, permitting some components of the gas mixture to pass through more readily than others. Membranes used for gas separation processes wherein the separation mechanism is controlled principally by solubility and diffusivity, as opposed to free molecular diffusion, are classified as nonporous membranes. Nonporous membranes have a dense control layer which is crucial to membrane performance, and this layer can be adversely affected by moisture, chemical degradaton, or physical deformation.

Gas transfer through nonporous membranes is dependent upon the membrane surface area, the pressure differential across the membrane, the diffusion rate of the gaseous components, and the effective thickness of the membrane. Generally, the membrane layer through which the gases must diffuse should be as thin as possible to maximize gas diffusion rate. Membrane thinness, however, is limited by a need to have a membrane free from defects, such as pinholes, and the need to have a membrane which has sufficient physical integrity to withstand pressures up to about 4,000 pounds per square inch-gauge (psig) across the membrane. For example, asymmetric cellulose ester membranes can be produced which do have a very thin but dense (nonporous) layer and a supporting sublayer of larger pore size. The thin dense layer controls the mass transfer in the system, and the thicker sublayer provides structural integrity. Many types of membranes, including cellulose esters and polymeric membranes, such as silicate rubber, polyethylene and polycarbonate, may be employed in gas separation. The particular membrane used, however, depends upon the separation sought to be effected.

Triethylphosphate is a commonly used casting solution component in processes for making casted cellulosic polymer, especially cellulose acetate butyrate, membranes. Moreover, U.S. Pat. No. 3,607,329 to Manjikian states that it is essential to include from 15 to 25 weight percent triethylphosphate in solutions used to cast cellulose acetate butyrate membranes.

Commerical gas separation processes are generally continuous processes in which a feed gas stream is brought into contact at the feed side of a membrane. The pressure on the feed side of the system is maintained at a pressure sufficiently higher than the pressure on the permeate side of the membrane to provide a driving force for the diffusion of the most permeable components of the gaseous mixture through the membrane. The partial pressure of the more permeable gaseous components is also maintained at a higher level on the feed side of the membrane than on the permeate side by constantly removing both the permeate stream and the residue of the feed stream from contact with the membrane. While the permeate stream can represent the desired product, in most gas permeation processes the desired product is the residue stream, and the permeate stream consists of contaminants which are removed from the feed stream.

For example, $CO_2$ and $H_2S$ can be removed from a hydrocarbon mixture, such as natural gas, using a thin dried supported cellulose ester membrane, and a differential pressure across the membrane of about 100 psi. The partial pressures of $CO_2$ and $H_2S$ in the permeate stream are preferably kept at about 80 percent or less of the partial pressure of those same components in the feed stream by separately and continuously removing the depleted feed gas (residue) stream and the permeate stream from contact with the membrane. The residue stream can, of course, be fed to another gas separation membrane stage, and the permeate gas stream can likewise be fed to another separation stage to produce a product having a still higher concentration of the more permeable products. In fact, the use of multiple separation steps in series and/or in parallel offers considerable diversity in separation alternatives using membrane technology so long as sufficient pressures can be maintained in the system.

Feed stream pressures can vary from 10 to 4,000 psig, but are generally within the range of about 500 psig to about 3,000 psig. The differential pressure across the membrane can be as low as about 10 pounds per square inch (psi) or as high as about 2,100 psi depending on many factors, such as the particular membrane used, the flow rate of the inlet stream, and the availability of a compressor to compress the permeate stream, if such compression is desired. A differential pressure of at least 100 psi is preferred since lower differential pressure may require more modules, more time, and compression of intermediate product streams of modules arranged in series. Differential pressures of 1,200 psi or less are also generally preferred since the useful life of membranes is generally greater.

Spiral wound membrane arrangements are becoming more commonly used in commercial gas separation processes. An advantage of using a spiral wound technique is that this affords a large membrane contact area while permitting a rather small overall containment vessel. A standard way of supplying spiral wound membranes for commercial use is in the form of membrane units which comprise a section of permeate conduit around which the membrane is wound. These membrane units may then be used singly or joined together in series by interconnecting their permeate conduit sections. The usual way to use spiral wound membrane units is to contain them, either singly or multiply in modules. The modules can then in turn be used singly or can be conveniently interconnected in series or parallel arrangements to provide the desired treatment.

For many years cellulose ester membranes have been employed in liquid separation systems, such as reverse osmosis processes for the desalination of water, as well as in gas separation processes. Membraneous materials have been produced from various esters, including cellulose acetate, cellulose diacetate, cellulose triacetate, cellulose propionate, cellulose butyrate, cellulose cyanoethylate, cellulose methacrylate, and certain mixtures thereof. Cellulose acetate esters have become particularly favored for producing asymmetric nonporous membranes for gas separation. Such membranes comprise a dense nonporous layer which overlies a more porous layer; and can be cast on cloth from solution, then heat treated, and then dried, typically using a solvent exchange procedure intended to remove water. Free standing membranes can be prepared by casting on a non-adhesive material (e.g. silicone-coated paper), and then separating the membrane from that material after it has gelled, but prior to heat treatment and drying. While free standing membranes have generally exhibited satisfactory performance, they are generally considered too fragile for commercial applications. Drying is necessary for application to gas separation, but simple evaporation of water can cause shrinkage and a loss of the membrane's asymmetric character. The solvent exchange procedure thus serves to prevent the membrane from shrinkage and loss of performance.

Although cellulose acetate esters have shown considerable utility for various gas separation applications, they are not without disadvantages. They are relatively brittle in the dry state, and thus, their dependability over the long term may be affected by system disorders, particularly while adverse system pressure fluctuations are experienced. Moreover, even under normal operation, these membranes frequently exhibit a decline in permeation rates over time, particularly if there is a high moisture content.

In an effort to develop membranes with improved flexibility over cellulose acetate membranes, cellulose acetate butyrate membranes, both with and without heat treatment, have been studied for gas separation systems. Cellulose acetate butyrate membranes, like cellulose acetate membranes, had a history of use in liquid systems where they exhibited relatively favorable selectivity for a variety of inorganic and organic solutes. These membranes have been cast from a variety of formulations. However, heat treatment of cellulose acetate butyrate membranes above about 50° C., as typically used for cellulose acetate membranes, was generally avoided because it could substantially reduce performance of the butyrate membrane. Reference is made to U.S. Pat. No. 3,607,329 as an example of such membranes. Cellulose acetate butyrate membranes have in the past generally been considered poor performers when compared to the cellulose acetate membranes.

In a report published in October 1976 Schell et al. published a report of attempts to use cellulose acetate butyrate membranes for gas separation. Schell, W. J. et al., Membrane Applications to Coal Conversion Processes, U.S. Dept. of Commerce National Technical Information Service, FE-2000-4. This report describes gas permeation rates and selectivity factors which were measured for a series of cellulose acetate butyrate membranes, Id at pp.86–89. Because membranes containing cellulose acetate butyrate were found to have poor performance characteristics, low permeation rates or low selectivity, these authors concluded that these membranes were not suitable at least for large scale gas separation processes and thus discontinued further work on cellulose acetate butyrate membranes.

The useful life of gas separation membranes, including in particular spiral wound membranes, has not been entirely predictable. Various factors are believed to affect the performance of membranes over time. These include the normal operating pressure differentials, the character of the gas being treated, the quality of the membrane itself and system disorders to which the membrane is subjected. A continuing challenge for those seeking to use gas separation membrane systems has been to improve the reliability of membrane systems, especially by prolonging the useful life of the membranes used therein.

One particular application of gas separation membranes is for separation of ammonia plant purge gases to provide a suitable hydrogen stream for reuse in ammonia synthesis. Many membranes, however, are adversely affected by ammonia in the purge gases. This necessitates pretreatment of the purge gases to remove ammonia.

SUMMARY OF THE INVENTION

Cellulose acetate butyrate-based gas separation membranes are prepared by forming a casting solution comprising from about 10% to about 30% of certain cellulose acetate butyrate polymers, from about 35% to about 75% of polymer solvent selected from the group consisting of acetone, dioxane, and mixtures thereof, and from about 2% to about 40% of at least one pore-forming agent selected from the group consisting of formamide, maleic acid, n-propanol, glycerol, formic acid, pyridine, and water; casting the membrane by coating a substantially flat support surface with a film of the casting solution, preferably from about 3 to about 20 mils thick; forming a dense layer on the exposed film surface by evaporating the polymer solvent in a substantially dry environment for about 10 to about 80 seconds at a temperature of about 15° to about 35° C.; gelling the film in water at a temperature of about 0° C. to about 22° C.; and washing the resultant membrane with an effective amount of a washing liquid, preferably water, suitable for removing the remaining polymer solvent and the pore forming agents therefrom. Then the membrane is preferably dried, particularly when water wash is used, by solvent exchange. There is generally no need for annealing (i.e. heating to at least about 65° C. before drying) of membranes prepared and used in accordance with this invention. The preferred solvent exchange technique comprises two steps: the first using alcohol to replace water; and the second using a non-polar volatile liquid to replace the alcohol. The volatile liquid is then evaporated to obtain the dry membrane.

The casting solution is preferably filtered, for example, through a seven micron filter and/or allowed to stand quiescently, prior to casting so that air bubbles or other materials entrained in the solution can be substantially precluded from the cast film.

Cellulose acetate butyrate membranes of this invention are resistant to ammonia and thus are considered particularly useful for separating gases, such as ammonia plant purge gases, which contain ammonia.

DETAILED DESCRIPTION

Figure 1:
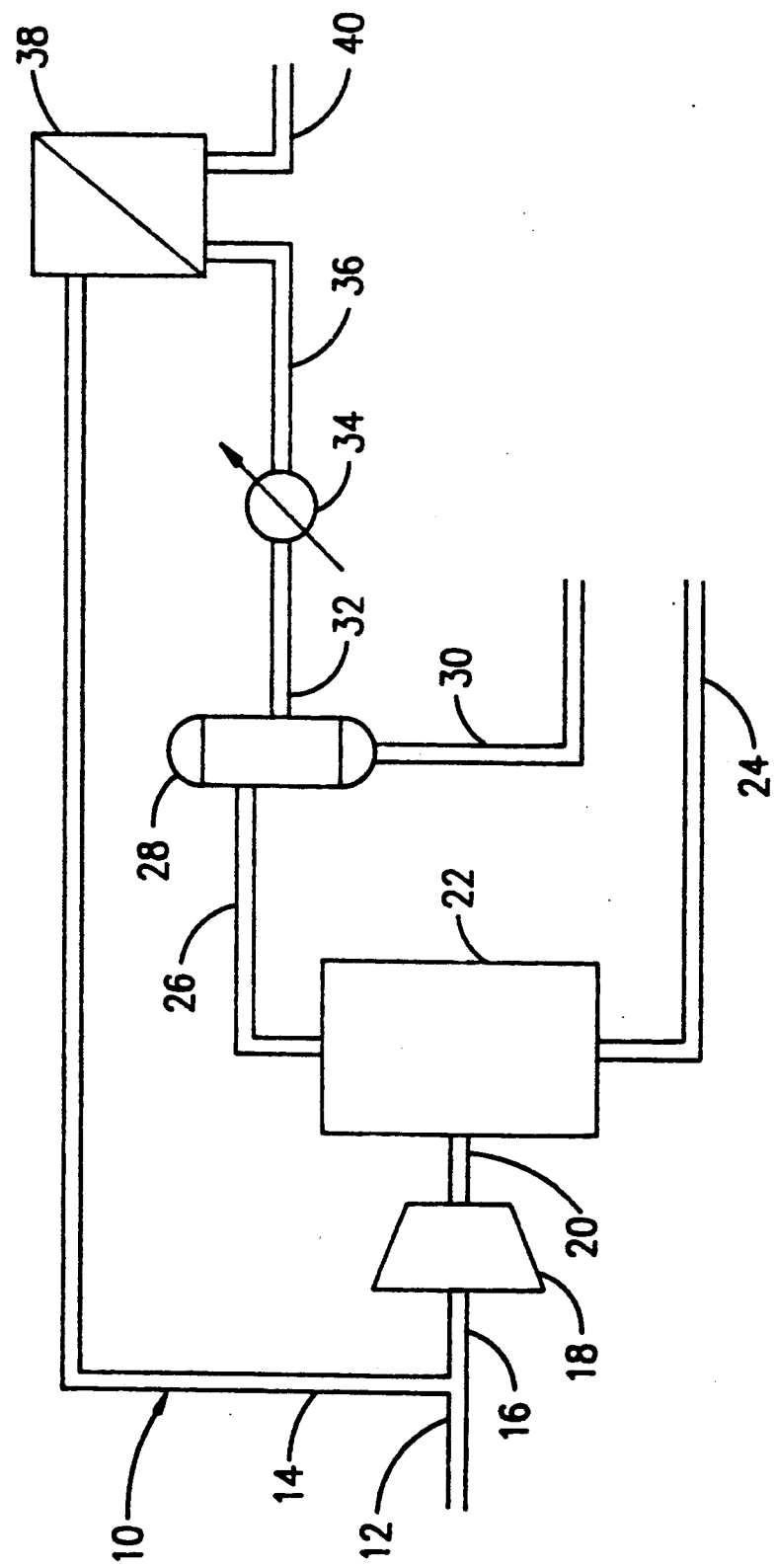
FIG. 1 is a schematic representation of an ammonia synthesis process employing gas membrane separation of purge gases.

The present invention comprises high performance cellulose acetate butyrate gas separation membranes, methods for preparing these membranes, and methods for using these membranes to separate gases into a permeate fraction which passes through the membrane and a residual fraction which does not pass through the membrane. High performance cellulose acetate butyrate membranes refer to membranes having carbon dioxide permeability of at least about 5, preferably at least about 10 Standard Cubic Feet per Hour (SCFH) per ft$^2$ per 100 psi and a carbon dioxide to methane separation factor of at least about 21, preferably at least about 25. Performance factors such as carbon dioxide permeability and carbon dioxide to methane separation factors readily are determinable by those skilled in the art.

In accordance with this invention, a cellulose acetate butyrate membrane casting solution is formed comprising by weight from about 10% to about 30% cellulose acetate butyrate polymer; from about 35% to about 75% polymer solvent selected from the group consisting of acetone, dioxane and triethylphosphate, and mixtures thereof; from about 2% to about 40%, preferably between about 15% and about 30%, of at least one pore-forming agent selected from the group consisting of formamide, maleic acid, n-propanol, glycerol, formic acid, pyridine and water. Surprisingly, it was discovered that including greater than 15 weight percent triethylphosphate in the casting solution may be detrimental to the $CO_2/CH_4$ separation factors of the resulting membranes. Thus, the casting solutions used in this invention preferably have less than about 5 weight % triethylphosphate, more preferably less than about 1 weight percent triethylphosphate, most preferably less than 0.1 weight percent triethylphosphate.

The cellulose acetate butyrate polymer used in the casting solution may be generally represented by the formula:

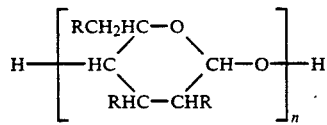

wherein each R in the polymer is independently selected from the group consisting of —OH (i.e. hydroxyl), —OOCCH$_3$ (i.e. acetate), and —OOCCH$_2$CH$_2$CH$_3$ (i.e. butyrate) such that the weight percent of butyryl groups (i.e., —OCCH$_2$CH$_2$CH$_3$) in the polymer is from about 10 to about 45, preferably from about 15 to 40 weight percent; the weight percent of acetyl groups (i.e. —OCCH$_3$) in the polymer is from about 2 to about 35, preferably from about 10 to about 30 weight percent; and the weight percent of hydroxyl groups in the polymer is from about 0.8 to about 2, preferably from about 1.5 to about 1.8 weight percent; and wherein n is chosen such that the number average molecular weight of the cellulose acetate butyrate polymer is at least about 20,000, preferably about 40,000 or more, most preferably 60,000 or more, and preferably 250,000 or less, and most preferably 70,000 or less. An example of suitable cellulose acetate butyrate is available commercially in powdered form as CAB 171-15S from Eastman Chemicals of Kingsport, Tenn. The casting solution can be prepared simply by dissolving the cellulose acetate butyrate and the pore forming agent in the solvent. This can generally be done at room temperature using a conventional mixer.

The preferred solvents are acetone and dioxane, with acetone being the most preferred. The preferred pore forming agents are formamide, maleic acid, n-propanol, glycerol, and formic acid with the most preferred agent being a mixture of formamide and maleic acid in a weight ratio of formamide to maleic acid of between about 4:1 and about 1:1, preferably about 2:1. The most preferred casting solutions are thus substantially water-free.

One type of preferred casting solution consists essentially of cellulose acetate butyrate, acetone, foramide and maleic acid. A particularly preferred casting solution comprises from about 16% to about 26%, most preferably about 24%, cellulose acetate butyrate; from about 40% to about 60%, most preferably about 47.5% polymer solvent, preferably acetone; and from about 15% to about 30% pore forming agent, preferably a combination consisting of from about 5% to about 25%, most preferably about 19%, formamide together with from about 5% to about 25%, most preferably about 9.5%, maleic acid.

The casting solution is preferably filtered to remove solids which might otherwise interfere with membrane integrity. A seven micron filter is generally suitable. It is also preferred to allow the solution to stand to allow unfiltered solids to settle and to allow gas bubbles to escape. Generally, this may be suitably accomplished by simply storing the solution for about 4 to about 24 hours at room temperature (i.e., 20° C. to 25° C.).

In any case, the membrane is cast by coating a substantially flat support surface with a film of the casting solution. The support surface may be one such as glass or coated paper which is used only during formation and is separated from the formed membrane; but normally, the support surface will be a porous material such as polyamide fabric which can be used to strengthen the finished membrane after formation and during use. The thickness of the film may vary considerably since the dense layer, which will substantially control the permeability, is considered to form primarily on an exposed surface, rather than thickness basis, and since the thickness may depend upon the composition and viscosity of the casting solution. Nevertheless, a film thickness of from about 3 mils to 20 mils thick is generally preferred for casting solutions of this invention to achieve a relatively strong membrane which can be conveniently incorporated into gas separation apparatus. Film thicknesses between about 8 mils and 16 mils are most preferred.

After the casting solution is cast onto said support surfaces, the polymer solvent is evaporated from the film in a substantially dry environment for about 10 to about 80 seconds, preferably from about 10 to about 30 seconds, most preferably about 18 seconds at a temperature of about 15° C. to about 35° C. During this evaporation process, the dense (i.e., nonporous) layer is formed at the exposed film surface (i.e., the film surface remote from the support surface). The preferred manner of evaporation comprises passing relatively clean and dry air over the film at the desired temperature.

Following formation of the nonporous layer the film is gelled at a temperature of from about 0° C. to about 15° C., preferably at about 2° C. or less, and then washed to substantially remove the remaining polymer solvent, thereby establishing an integrity to the structure of the membrane. Gelling can be conveniently accomplished by immersing the film in an ice-cooled water bath. The washing also substantially removes the pore forming agents, thereby forming pores in the layer which underlies the dense layer formed during solvent evaporation as described above. The preferred washing liquid is also water, but the wash water should then be removed in order to provide a suitable gas separation membrane. Inasmuch as direct evaporation of water from the membrane structure can adversely affect the performance of gas separation membranes, the membrane therefore preferably is dried, particularly when water gelling and wash is used, by solvent exchange. The preferred solvent exchange steps comprise first using an alcohol, most preferably one selected from the group consisting of methanol, ethanol, propanol, and butanol, to replace water in the membrane, and then using a non-polar volatile liquid most preferably one selected from the group consisting of pentane, hexane, heptane, benzene, toluene, and carbon disulfide, to replace the alcohol. The volatile liquid then may be evaporated as, for example, by passing air at a temperature between about 15° C. and 35° C. over one membrane to obtain the dry membrane suitable for use in gas separation. Membranes prepared in accordance with this invention can be used effectively without requiring an additional step of heat annealing the membrane at a temperature of at least about 65° C., for example, at about 75° C. to about 90° C. prior to drying. Indeed, membranes are preferably prepared in accordance with this invention without exposing the cast film or the membrane to temperatures of about 50° C. or above prior to drying.

Preparation of membranes in accordance with this invention will become further apparent from the following non-limiting examples.

EXAMPLE I

A casting solution of about 23.8 weight percent cellulose acetate butyrate (Eastman Chemicals, CAB 171-15S), 47.6 weight percent acetone, 19.1 weight percent formamide, and 9.5 weight percent maleic acid was prepared and filtered through a seven micron filter. The solution was stored at room temperature (i.e. about 23° C.) over night (i.e., about 12 hours). A 10 mil thin solution film was coated on top of a flat support of polyamide fabric about 5 mils thick. The acetone was evaporated from the film for about 17.5 seconds in a dry environment having a temperature of about 25° C. The film was gelled to form the membrane by immersing it with its fabric support in an ice cold water tank (i.e., about 2° C.). The membrane was then washed with water at room temperature to remove residual solvent and the pore forming agents, solvent exchanged first with isopropyl alcohol and then with hexane, and the hexane was then evaporated by dry air at a temperature of about 25° C. to obtain a dry membrane which with the polyamide fabric support had a thickness of about 10.3 mils. A membrane obtained in this manner, without annealing, exhibited a carbon dioxide permeability of about 11.6 SCFH/ft$^2$ (standard cubic feet per hour per square foot) per 100 psi differential pressure, a methane permeability of about 0.27 SCFH/ft$^2$ per 100 psi differential pressure, and thus a separation factor for $CO_2/CH_4$ of about 43.

The cellulose acetate butyrate used in this example has a number average molecular weight reported as about 65,000, a butyryl content reported as about 17 weight percent, an acetyl content reported as about 29.5 weight percent, and a hydroxyl content reported as about 1.5 weight percent. In contrast, a similar procedure using cellulose acetate butyrate having a number average molecular weight reported as about 40,000, a butyryl content reported as about 50%, an acetyl content reported as about 5%, and a hydroxyl content reported as about 0.5 weight percent could not be formed into a membrane.

EXAMPLE II

A membrane was prepared as in Example I, except that the coating solution had about 20.0 weight percent cellulose acetate butyrate, 45.0 weight percent acetone, 25.0 weight percent triethylphosphate, 6.0 weight percent n-propanol, 2.0 weight percent glycerol, and 2.0 weight percent water. The resultant membrane had a total thickness (with support) of about 11.1 mils and exhibited a carbon dioxide permeability of about 25.6 SCFH/ft$^2$ per 100 psi differential pressure, a methane permeability of about 1.88 SCFH/ft$^2$ per 100 psi differential pressure, and thus a separation factor for $CO_2/CH_4$ of about 14.

EXAMPLE III

A membrane was prepared as in Example I, except that the coating solution had about 19.8 weight percent cellulose acetate butyrate, 44.6 weight percent acetone, 24.7 weight percent triethylphosphate, 5.9 weight percent n-propanol, 2.0 weight percent glycerol, and 3.0 weight percent water. The resultant membrane had a total thickness (with support) of about 12.7 mils and exhibited a carbon dioxide permeability of about 26.1 SCFH/ft$^2$ per 100 psi differential pressure, a methane permeability of about 2.88 SCFH/ft$^2$ per 100 psi differential pressure, and thus a separation factor for $CO_2/CH_4$ of about 9.

EXAMPLE IV

A membrane was prepared as in Example I, except that the coating solution had about 20.0 weight percent cellulose acetate butyrate, 47.0 weight percent acetone, 20.0 weight percent triethylphosphate, 6.0 weight percent n-propanol, 2.0 weight percent glycerol, and 5.0 weight percent pyridine. The resultant membrane had a total thickness (with support) of about 11.2 mils and exhibited a carbon dioxide permeability of about 27.7 SCFH/ft$^2$ per 100 psi differential pressure, a methane permeability of about 1.77 SCFH/ft$^2$ per 100 psi differential pressure, and thus a separation factor for $CO_2/CH_4$ of about 16.

EXAMPLE V

A membrane was prepared as in Example I, except that the casting solution had about 22.0 weight percent cellulose acetate butyrate, 44.0 weight percent acetone, 24.0 weight percent triethylphosphate, 6.0 weight percent n-propanol, 2.0 weight percent glycerol, and 2.0 weight percent formic acid. The resultant membrane had a total thickness (with support) of about 11.5 mils and exhibited a carbon dioxide permeability of about 18.2 SCFH/ft$^2$ per 100 psi differential pressure, a methane permeability of about 0.72 SCFH/ft$^2$ per 100 psi differential pressure, and thus a separation factor for $CO_2/CH_4$ of about 25.

EXAMPLE VI

A membrane was prepared as in Example I, except that the cold water tank in which the membrane was gelled had a temperature of about 11° C. The resultant membrane had a total thickness (with support) of about 9.7 mils and exhibited a carbon dioxide permeability of about 13.7 SCFH/ft$^2$ per 100 psi differential pressure, a methane permeability of about 1.47 SCFH/ft$^2$ per 100 psi differential pressure, and thus a separation factor for $CO_2CH_4$ of about 9.

EXAMPLE VI(a)

A membrane was prepared as in Example I except that the casting solution had 20.4 weight percent cellulose acetate butyrate, 45.9 weight percent acetone, 20.4 weight percent triethylphosphate, 6.1 weight percent N-propanol, 2.0 weight percent glycerol, and 5.1 weight percent pyridine. The measured membrane performance indices are as shown in Example VI(c).

EXAMPLE VI(b)

A membrane was prepared as in Example I except that the casting solution had 21.3 weight percent cellulose acetate butyrate, 53.2 weight percent acetone, 17 weight percent formamide, and 8.5 weight percent maleic acid. The measured membrane performance indices are as shown in Example VI(c).

EXAMPLE VI(c)

The following Table shows measured performance indices of membranes of this invention. All membranes were cast in a thickness of 10 mil and gelled at 2° C. Solvent evaporation time was 17.5 seconds under forced air flow at 4 SCFM through an opening of approximately 40" wide and 1½" thick opening above the casting solution.

| Polymer Solution* | $CO_2$ Permeability SCFH/f$^2$ · 100 PSI | Separation $CO_2/CH_4$ |
|---|---|---|
| 1 | 11.6 | 43 |
| 2 | 25.6 | 14 |
| 3 | 26.1 | 9 |
| 4 | 27.7 | 16 |
| 5 | 18.2 | 25 |
| 6 | 12.6 | 16 |
| 7 | 22.0 | 36 |

*Membranes of Examples I through V, VI(a), and VI(b) correspond to polymer solutions 1 through 7, respectively.

EXAMPLE VII

A membrane was prepared as in Example I, except that the membrane was annealed at a temperature of about 90° C. for about 20 minutes before drying. The resultant membrane had a total thickness (with support) of about 10.4 mils and exhibited a carbon dioxide permeability of about 10.6 SCFH/ft$^2$ per 100 psi differential pressure, a methane permeability of about 0.26 SCFH/ft$^2$ per 100 psi differential pressure, and thus a separation factor for $CO_2/CH_4$ of about 41.

Membranes prepared in accordance with this invention exhibit a surprising stability over time with respect to flux (i.e. total gas permeation rate through a given area of membrane) where they are used to separate a feed gas stream comprising a mixture of gases into a gas permeate fraction which passes through the membrane and is relatively rich in at least one of the gases in the feed mixture, and a residual fraction which does not pass through the membrane and is relatively rich in at least one of the other gases of the feed mixture. The membranes are generally considered effective in gas systems which are not supersaturated with water. When caustic gases such as ammonia are present, however, the gases should be moisture-free. The stability of these membranes and their ability to treat gases such as ammonia, at least in the absence of water vapor, are particularly valuable attributes when using such a membrane in a substantially steady state process involving the substantial separation of at least one gas in a gaseous mixture, preferably a mixture containing ammonia, from at least one other gas in the mixture by selective permeation. A preferred use is for hydrogen separations, from feed gases which comprise hydrogen and at least one other gas such that the permeate fraction contains a higher mole percentage of hydrogen than the feed gas, and particularly for gas separation processes such as hydrogen recovery from process gas streams in ammonia plants which are essentially free of moisture.

In one application, cellulose acetate butyrate membranes can be used to achieve relatively stable hydrogen separation from a purge gas stream in an ammonia plant. Such purge gas streams typically comprise hydrogen and nitrogen as well as other components, some of which may be detrimental to the ammonia synthesis process; and it is desirable to recover a hydrogen-rich permeate fraction for reuse in ammonia synthesis, and to obtain for disposal a residual fraction which is depleted in hydrogen relative to the purge gas fed to the membrane, and which preferably contains significant amounts of any purge gas components detrimental to ammonia synthesis. For example, methane may be present in the purge gases, and although it may not adversely affect the ammonia synthesis catalysts employed, its build-up would depress the hydrogen and nitrogen partial pressures, and therefore reduce the efficiency of ammonia production. It is thus desirable to concentrate methane in the residual fraction for removal from the ammonia synthesis process.

The purge gases in ammonia synthesis also typically contain some ammonia and are essentially free of water vapor. The membranes of this invention are considered relatively resistant to ammonia in the absence of water vapor, and can be used in certain instances to provide a permeate fraction which is relatively rich in ammonia as well as hydrogen. Other gases which might be present in ammonia plant process streams include, as stated above, methane, but typically such streams are substantially free of hydrocarbons having two or more carbon atoms per molecule.

A particularly suitable application for cellulose acetate butyrate membranes will become further apparent by reference to the schematic drawing of FIG. 1 directed to a typical use of membrane separation for hydrogen recovery from purge gases in an ammonia synthesis plant. The overall process (10) comprises a feed gas inlet line (12) where the feed gases, principally nitrogen and hydrogen, are fed to the system. Often the feed gases are generated by reforming natural gas in the presence of air and substantially removing oxygen-containing byproducts (e.g. carbon monoxide, carbon dioxide, and water). When reformed natural gas is used to produce the feed, the feed gas stream will contain methane in addition to hydrogen and nitrogen, as well as minor amounts of argon. In any case, the feed gas stream is mixed with the hydrogen-rich recycled gas stream from recycle line (14) and fed through mixed feed line (16) to a compressor (18). The compressed mixed feed is then fed through line (20) into an ammonia synthesis loop shown schematically as (22). The synthesis loop may contain various stages, but results in ammonia product, which is recovered and a purge gas which may be partially reused or removed from the system. In FIG. 1, the ammonia products recovered through a product line (24) and the purge gas which is directed through purge gas line (26). Purge gas in ammonia synthesis typically contains hydrogen and nitrogen, as well as minor amounts of ammonia and argon and, where reformed natural gas is used to produce the feed, methane is also generally present.

For many membrane systems even minor amounts of ammonia (say more than about 0.02 percent) have been found detrimental to the membrane structure even in the absence of water vapor, and purge gases with ammonia partial pressures of 1 psi or less can thus be of concern. In these instances, a purge gas water scrubber such as that shown in FIG. 1 as (28) may be provided to substantially remove purge gas ammonia as an aqueous solution of ammonia. In FIG. 1, the ammonia solution is recovered through solution line (30). The scrubbed purge gases are then typically directed through a purge gas line as shown at (32) to a heat exchanger as shown at (34) where the stream is heated to reduce its relative humidity. The heated purge gas stream may then be directed, through membrane separator unit inlet line (36), to the membrane separator unit (38). The separator unit separates the gas into gases which are relatively permeable such as hydrogen, and gases which have low permeability, such as methane and nitrogen. The low permeability gases are removed from the system through residual line (40), while the permeated gases are recycled for reuse through recycle line (14).

While cellulose acetate butyrate membranes can be used advantageously in the membrane separator unit (38) of the process shown in FIG. 1, the membranes of this invention have been found particularly resistant to ammonia, and are considered suitable for directly treating the purge gases from the ammonia synthesis loop (22) containing at least 0.5 volume percent ammonia. The invented membranes preferably are used to treat purge gases having not more than about 65 psi ammonia which is equivalent to 6.5 volume percent in a 1,000 psi purge stream or 13 volume percent in a 500 psi purge stream. In other words, the costly steps of scrubbing the purge gases and heating the scrubbed purge gases to lower the relative humidity can be eliminated, and the purge gases (i.e. the gases from purge gas line (26)) can be directed to the membrane separator unit inlet line (36) without scrubbing or otherwise pretreating the purge gases to remove ammonia gas therefrom. The temperature of the purge gases from the ammonia synthesis loop are typically relatively low, often below 0° C., and the pressure of the gases can vary considerably. In any case, the temperature of the purge gases containing the cellulose acetate butyrate membrane should generally be below about 65° C., preferably below about 45° C., and the pressure drop across the membrane (i.e. the differential pressure) should generally be about 2100 psi or less, preferably about 1200 psi or less.

Use of the membranes in accordance with this invention will become further apparent from the following non-limiting examples.

EXAMPLE VIII

Figure 2:
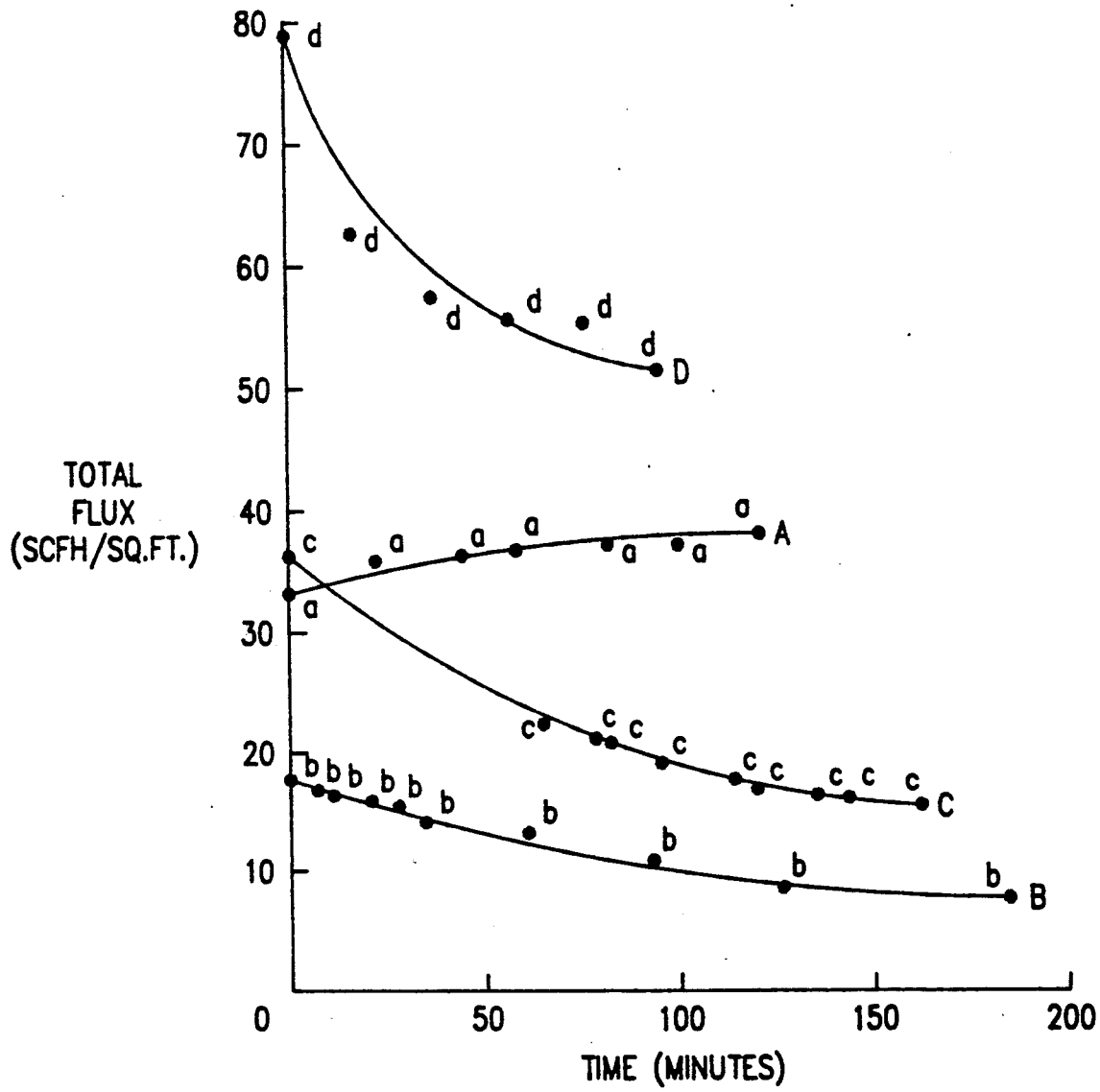
FIG. 2 is a plot of the total flux passing through membranes tested under the various conditions hereinafter described, as a function of time.

A membrane prepared in accordance with Example No. I was tested in a laboratory apparatus wherein a feed gas blend having a composition generally representative of ammonia plant purge gas (the mole fractions of hydrogen, ammonia, nitrogen, and methane being respectively about 0.668, 0.061, 0.117, and 0.094) was passed to a membrane unit employing a flat sheet of the membrane and separated therein into a permeate stream and a residual stream. Means were provided for maintaining the feed pressure and permeate pressure, and for measuring the permeate flow rate and composition. The feed pressure was held at about 1085 psi (pounds per square inch gauge), the pressure of the permeate stream was held at about 300 psig, and the temperature was held at about 55° C. The ammonia partial pressure in the feed was thus about 66 psig. The flux (i.e. gas flow) through the membrane as a function of time is shown in Curve A of FIG. 2.

A comparison of the permeate composition and permeabilities (in standard cubic feet of the component permeating through square foot of membrane surface area per hour, per 100 psi drop in the partial pressure of the component across the membrane) after about ten minutes and after about two hours is given below in Table A.

TABLE A

| Component | Permeate Mole Fraction | | Permeability SCFH/ft$^2$-100 psi | |
|---|---|---|---|---|
| | 10 minutes | 2 hours | 10 minutes | 2 hours |
| Hydrogen | 0.787 | 0.789 | 5.78 | 6.30 |
| Ammonia | 0.131 | 0.127 | 17.73 | 20.46 |
| Nitrogen | 0.048 | 0.048 | 0.79 | 0.79 |
| Methane | 0.034 | 0.035 | 1.05 | 1.23 |

The gas flow through the membrane (i.e. the permeate flow) was about 33.4 SCFH/ft$^2$ after ten minutes and about 36.2 SCFH/ft$^2$ after two hours.

The performance of the membranes of this invention as demonstrated in Example VIII can be compared to the performance of a thin film solution cast cellulose acetate/cellulose triacetate (hereinafter "CA/CTA") membrane which is considered representative of membranes generally used in gas separation. The heat annealed CA/CTA membrane of about 7 to 12 mils in thickness was obtained from Grace Membrane Systems of Houston, Tex. and was tested as outlined in the following Examples IX-XI.

EXAMPLE IX

The CA/CTA membrane was tested in the laboratory apparatus of Example VIII. A feed gas blend (mole fractions of hydrogen, ammonia, nitrogen, and methane being respectively 0.600, 0.061, 0.1672, and 0.1718) was passed to a membrane unit employing a flat sheet of the membrane at a pressure of about 1000 psig (i.e. an ammonia partial pressure of about 61 psig). The pressure of the permeate stream was held at about 400 psig, and the temperature was held at about 24° C. The flux through the membrane as a function of time is shown in Curve B of FIG. 2.

A comparison of the permeate composition and the permeabilities after about 30 minutes and after about three hours is given below in Table B.

TABLE B

| Component | Permeate Mole Fraction | | Permeability SCFH/ft$^2$-100 psi | |
|---|---|---|---|---|
| | 30 minutes | 3 hours | 30 minutes | 3 hours |
| Hydrogen | 0.795 | 0.795 | 4.54 | 2.46 |
| Ammonia | 0.105 | 0.095 | 9.43 | 3.64 |
| Nitrogen | 0.039 | 0.045 | 0.37 | 0.23 |
| Methane | 0.061 | 0.066 | 0.59 | 0.35 |

The gas flow through the membrane (i.e. the permeate flow) was about 15.2 SCFH/ft$^2$ after 30 minutes and about 8.2 SCFH/ft$^2$ after three hours.

EXAMPLE X

The CA/CTA membrane was tested in the laboratory apparatus of Example VIII. A feed gas blend (mole fractions of hydrogen, ammonia, nitrogen, and methane being respectively 0.602, 0.047, 0.174, and 0.177) was passed to a membrane unit employing a flat sheet of the membrane at a pressure of about 1700 psig (i.e. an ammonia partial pressure of about 80 psig). The pressure of the permeate stream was held at about 400 psig, and the temperature was held at about 24° C. The flux through the membrane as a function of time is shown in Curve C of FIG. 2.

A comparison of the permeate composition and the permeabilities after about one hour and after about two hours is given below in Table C.

TABLE C

| Component | Permeate Mole Fraction | | Permeability SCFH/ft$^2$-100 psi | |
|---|---|---|---|---|
| | One hour | 2 hours | One hour | 2 hours |
| Hydrogen | 0.807 | 0.799 | 2.72 | 2.05 |
| Ammonia | 0.103 | 0.115 | 5.72 | 5.58 |
| Nitrogen | 0.037 | 0.034 | 0.28 | 0.19 |
| Methane | 0.053 | 0.051 | 0.39 | 0.29 |

The gas flow through the membrane (i.e. the permeate flow) was about 22.3 SCFH/ft$^2$ after one hour and about 17.0 SCFH/ft$^2$ after two hours.

EXAMPLE XI

The CA/CTA membrane was tested in the laboratory apparatus of Example VIII. A feed gas blend (mole fractions of hydrogen, ammonia, nitrogen, and methane being respectively 0.614, 0.121, 0.193, and 0.072) was passed to a membrane unit employing a flat sheet of the membrane at a pressure of about 1085 psig (i.e. an ammonia partial pressure of about 131 psig). The pressure of the permeate stream was held at about 300 psig, and the temperature was held at about 57° C. The flux through the membrane as a function of time is shown in Curve D of FIG. 2.

A comparison of the permeate composition and the permeabilities after about five minutes and after about eighty minutes is given below in Table D.

TABLE D

| Component | Permeate Mole Fraction | | Permeability SCFH/ft$^2$-100 psi | |
|---|---|---|---|---|
| | 5 minutes | 80 minutes | 5 minutes | 80 minutes |
| Hydrogen | 0.768 | 0.755 | 14.81 | 10.45 |
| Ammonia | 0.184 | 0.185 | 17.31 | 12.59 |
| Nitrogen | 0.031 | 0.039 | 1.14 | 0.96 |
| Methane | 0.017 | 0.021 | 1.68 | 1.39 |

The gas flow through the membrane (i.e. the permeate flow) was about 78.8 SCFH/ft$^2$ after five minutes and about 55.04 SCFH/ft$^2$ after 80 minutes.

In all of the Examples VIII through XI, the feed flow rate was kept sufficiently high to provide substantially constant mole fractions of the components on the feed side of the membrane. It is evident from a comparison of Examples VIII through XI that the membrane of this invention surprisingly exhibited relatively low variation in total flux over the time period given. This performance is further shown in FIG. 2 where the membrane of the invention shows a relatively steady flux, whereas in each of the Examples using CA/CTA membranes, the flux continued to drop with time. It is believed that the total flux through the CA/CTA membranes used in Examples IX, X, and XI would drop to near zero SCFH/ft$^2$ within several days, while the total flux through the cellulose acetate butyrate would remain relatively constant over the same period. Moreover, as shown in Table A above, the permeate composition and the component permeabilities remained relatively constant. Thus, membranes of this invention are considered especially suitable for use where relatively stable performance is important, particularly in the presence of ammonia gas.

Without confining the invention to any theory of operation, it is believed that membranes produced in accordance with this invention exhibit superior resistance to attack by ammonia, especially relative to CA/CTA membranes. Indeed, the shrinkage for free standing membranes prepared in accordance with this invention and exposed to pure gaseous ammonia at 20 psi and about 22° C. for about 3 hours was about 1 percent, while shrinkage of CA/CTA membranes under the same conditions was about 6 percent.

The Examples describe various embodiments of the invention. Other embodiments will be apparent to those skilled in the art from a consideration of the specification or practice of the invention disclosed herein. It is understood that modifications and variations may be practiced without departing from the spirit and scope of the novel concepts of this invention. It is further understood that the invention is not confined to the particular formulations and examples herein illustrated, but it embraces such modified forms thereof as come within the scope of the following claims.

I claim:

1. A process for using a gas separation membrane to separate a feed gas stream having at least two components into a permeate fraction which passes through the membrane and is relatively rich in at least one of the feed gas components and residual fraction which does not pass through the membrane and is relatively depleted in at least one of the feed gas components wherein the gas separation membrane comprises a cellulose acetate butyrate polymer having the formula:

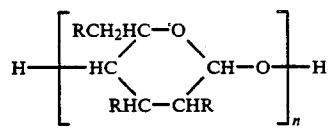

in which:
R each independently is OH, OOCCH$_3$, and OOCCH$_2$CH$_2$CH$_3$ such that the weight percent of the OOCCH$_2$CH$_2$CH$_3$ groups in the polymer is about 10 to 45, the weight percent of OOCCH$_3$ groups in the polymer is about 2 to about 35, and the weight percent of OH groups in the polymer is about 0.8 to about 2; and n is selected so that the number average molecular weight of the polymer is at least about 20,000; and provided that the membrane has a carbon dioxide permeability of at least about 5 SCFH per ft$^2$ per 100 psi and a carbon dioxide to methane separation factor of at least about 21.

2. A process of claim 1 wherein the gas separation membrane has a carbon dioxide permeability of at least about 10 SCFH per ft$^2$ per 100 psi and a carbon dioxide to methane separation factor of at least about 25.

3. A process of claim 2 wherein the feed gas comprises at least 0.5 volume percent ammonia.

4. A process of claim 1 wherein the cellulose acetate butyrate has a number average molecular weight between about 40,000 and 250,000.

5. A process of claim 1 wherein the weight percent of OOCCH$_2$CH$_2$CH$_3$ groups in the polymer is about 15 to 40, the weight percent of OOCCH$_3$ groups in the polymer is about 10 to 30, or the weight percent of OH groups in the polymer is about 1.5 to 1.8.

6. A process of claim 1 wherein the feed gas stream comprises at least 0.5 volume percent ammonia.

7. An asymmetric gas separation membrane comprising a cellulose acetate butyrate polymer having the formula:

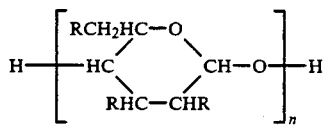

in which:

R each independently is OH, OOCCH$_3$, and OOCCH$_2$CH$_2$CH$_3$ such that the weight percent of the OOCCH$_2$CH$_2$CH$_3$ group in the polymer is about 10 to 45, the weight percent of OOCCH$_3$ groups in the polymer is about 2 to about 35, and the weight percent of OH groups in the polymer is about 0.8 to about 2; and n is selected so that the number average molecular weight of the polymer is at least about 20,000; and provided that the membrane has a carbon dioxide permeability of at least about 5 SCFH per ft$^2$ per 100 psi and a carbon dioxide to methane separation factor of at least about 21.

8. An asymmetric gas separation membrane of claim 7 having a carbon dioxide permeability of at least about 10 SCFH per ft$^2$ per 100 psi and a carbon dioxide to methane separation factor of at least about 25.

9. An asymmetric gas separation membrane of claim 7 wherein the cellulose acetate butyrate has a number average molecular weight between about 40,000 and 250,000.

10. An asymmetric gas separation membrane of claim 7 wherein the weight percent of OOCCH$_2$CH$_2$CH$_3$ groups in the polymer is about 15 to 40, the weight percent of OOCCH$_3$ groups in the polymer is about 10 to 30, or the weight percent of OH groups in the polymer is about 1.5 to 1.8.

* * * * *